Patented Feb. 20, 1945

2,369,668

UNITED STATES PATENT OFFICE 2,369,668

SULPHUR DYESTUFFS AND PROCESS OF PREPARING THE SAME

Arthur Lawrence Fox, Woodstown, N. J., assignor to E. I. du Pont de Nemours & Company, Wilmington, Del., a corporation of Delaware No Drawing. Application November 21, 1942, Serial No. 466,483

9 Claims. (Cl. 260—133)

This invention relates to novel sulphur colors which are prepared by the action of an aluminum-chloride-sulfur-monochloride complex upon carbocyclic compounds having at least one basic nitrogen atom. More particularly, this invention deals with novel coloring matters having the properties of sulphur dyestuffs and being obtainable by reacting with an aluminum-chloride-sulphur-monochloride complex of the constitution $AlCl_3.2S_2Cl_2$ upon aromatic compounds having in their structure primary, secondary or tertiary amines or nitrogen atoms forming part of a heterocyclic ring.

It is an object of this invention to provide a new and economical method for the production of sulphur colors. It is a further object of this invention to provide sulphur colors not now known. It is a further object of this invention to convert carbocyclic amines into insoluble dye pigments which may be applied to cotton fiber from a sodium sulfide vat. Other and further important objects of this invention will appear as the description proceeds.

In the past, sulphur colors have been prepared in general by reacting dye intermediates with sodium polysulfide over extremely long periods of time, e. g., 10 to 150 hours. Other methods employed have included high temperature fusions with sulfur or sulfides, but these methods have been destructive to the organic molecules involved.

By this invention there is provided a convenient, quick and economical method for preparing sulphur colors by treating aromatic amino compounds with a complex of sulphide chloride and aluminum chloride which is easily and cheaply prepared and which is extremely reactive. By this invention it is simply necessary to treat the organic molecule with this reagent for relatively short periods of time, depending on the activity of the molecule, and drown the reaction mass. It has been found in many cases that a reaction period of 5 minutes is ample, although longer reaction periods often produce deeper shades of the dye and introduce greater amounts of sulphur into the molecule.

It is worthy of note that treatment of organic compounds with sulphur monochloride in the presence of aluminum chloride as a catalyst has been done on various occasions in the art. However, these treatments did not result in the same products or mixtures of products as are obtainable according to this invention. The products from said older procedures were not dyestuffs, and their chlorine content was generally much larger than in the reaction products of this invention.

The distinctive feature of my present invention is that instead of using a mixture of sulphur monochloride and aluminum chloride, I employ a complex addition product of these two reagents carefully prepared in advance, as by heating the two reagents together in suitable proportions by weight. One of the commonest addition products thus obtained is a complex of constitution $AlCl_3.2S_2Cl_2$ whose specific gravity referred to water is 1.784 (Ruff and Golla, Zeit. f. anorg. u. algem. Chemie, vol. 138, pages 17–32; Zentralblatt, 1924, II, 1570). However, an excess of sulphur monochloride may be employed with the above complex, with the result that the reaction product may contain a larger proportion of chlorine, but is otherwise of the same general nature as in the preferred embodiments of this invention.

The characteristic of the novel compounds obtained according to this invention is that they are colored bodies of the sulphur dyestuff class. In order words, they may be reduced with aqueous sodium sulphide to produce a "sulphur dye vat," which has affinity for textile fiber, and which may be oxidized on the fiber into dyeings of good fastness qualities.

The crude reaction products of this invention are isolated by drowning the reaction mass in water or on ice and may be purified by extraction with dilute alkali. This dissolves the aluminum as sodium aluminate and converts any precipitate of sulphur to sodium sulphide or sodium sulphhydrate. It has been found that many of the sulphur colors made by this procedure are so easily vattable with sodium sulphide that the sodium sulphide produced in the action of the sodium hydroxide on the sulphur in the drowned crude product causes the colors to vat; consequently, in some cases, it is necessary to isolate the sulphur color by an oxidative procedure, such as blowing with air or treatment with an oxidizing agent. However, many of the other dyes formed are not vatted by the low concentration of sodium sulphide formed in the extraction and may be isolated directly by filtration. For the purpose of analysis, the crude materials purified by extraction with caustic may be further extracted with carbon disulfide to remove any free sulfur.

As already indicated, the dyes made according to this invention may be converted into soluble leuco derivatives by heating with sodium sulphide solutions. It has been found advisable in many cases to vat the dye by heating the dry material with sodium sulphide melted in its own water of crystallization. This concentrated solution easily vats the dye and on dilution completely soluble leuco vats are obtained. These may be employed to dye cotton and rayon. In other cases wool, silk, and nylon have been dyed, but due to the alkalinity of the vat, great care must be exercised not to destroy the fiber.

The following examples are given to illustrate this invention, without any intent however to limit my invention to the details of procedure. Parts mentioned are by weight.

*Part A.*—Preparation of the aluminum-chloride-sulphur-chloride complex.

1975 parts of aluminum chloride ($AlCl_3$) and 4215 parts of sulphur monochloride ($S_2Cl_2$) were mixed and heated at 90–95° C. for 36 hours. The reaction mass on cooling was a dark brown liquid comprising the sulphur chloride-aluminum chloride complex.

*Part B.*—Preparation of novel sulphur colors.

Example 1

100 parts of meta-toluylene diamine were reacted at room temperature with 600 parts of the aluminum-chloride-sulphur-monochloride complex prepared in Part A. The temperature rose spontaneously to about 100° C. and there resulted a sulphur color dyeing cotton from a sodium sulphide vat a light tan shade.

Example 2

100 parts of para-hydroxy-phenyl-beta-naphthylamine were reacted with 600 parts of the above mentioned aluminum-chloride-sulphur-monochloride complex for one hour at 100° C. A greenish black dye was obtained possessing fair wash fastness.

Example 3

100 parts of 2,4-dinitro-4'-hydroxy-diphenylamine were reacted with 600 parts of the aluminum-chloride-sulphur-monochloride complex at 100° C. for one hour. There was obtained a rich chocolate brown sulphur color which dyed cotton from a sodium sulphide bath.

Example 4

100 parts of para-ethoxy-p'-hydroxy-diphenylamine were reacted with 600 parts of the above aluminum-chloride-sulphur-monochloride complex for one hour at 100° C. It gave a gray blue dyestuff dyeing cotton from a sodium sulphide bath.

Example 5

100 parts of para-toluidine were reacted with 600 parts of the aluminum-chloride-sulphur-monochloride complex for one hour at 100° C. and gave on working up a yellow sulphur color.

Example 6

20 parts of formaldehyde aniline were reacted with 120 parts of the aluminum-chloride-sulphur-monochloride complex at 110° C. for four hours. This introduced 3 atoms of sulphur into the molecule, and the product dyed cotton a tan shade.

Example 7

One part of carbazole was reacted with 6 parts of the aluminum-chloride-sulphur-monochloride complex at the boil for 3 minutes. The product, after drowning, dyed cotton from a sodium sulphide vat a rich golden brown color.

It will be understood that the above examples are merely illustrative, and that wide variation in details of procedure may be practiced without departing from the spirit of this invention. In my copending application of even date, Serial No. 466,481, I have discussed at length miscellaneous permissible variations as to use of diluents, use of excess reagents of the sulphur-monochloride class or of the aluminum chloride class, optimum temperature, duration of the reaction, substituents in the initial organic material to be sulphurized, and other details. All these variations may be practiced with the invention set forth in the instant application.

I claim as my invention:

1. The process of preparing a sulphur type dyestuff, which comprises reacting a carbocyclic compound having at least one basic nitrogen atom with the complex compound obtainable by reacting aluminum chloride with sulphur monochloride at elevated temperature and in the absence of a solvent.

2. The process of preparing a sulphur type dyestuff, which comprises reacting an aromatic compound having at least one basic nitrogen atom with the complex compound obtainable by heating aluminum chloride with substantially two moles of sulphur monochloride at elevated temperature and in the absence of a solvent.

3. The process of preparing a sulphur type dyestuff, which comprises reacting an aromatic primary amine with the complex compound obtainable by heating aluminum chloride with substantially two moles of sulphur monochloride at elevated temperature and in the absence of a solvent.

4. The process of preparing a sulphur type dyestuff, which comprises reacting a diaryl amine with the complex compound obtainable by heating aluminum chloride with substantially two moles of sulphur monochloride at elevated temperature and in the absence of a solvent.

5. The sulphur-containing compounds obtainable by reacting with the complex addition product of aluminum chloride and sulphur monochloride having the formula $AlCl_3.2S_2Cl_2$ upon aromatic nitrogenous bases, said compounds being colored bodies, soluble in aqueous sodium sulphide solution and being capable of dyeing cotton from said solution by the standard sulphur-vat dye process.

6. As a new dyestuff, the reaction product of an aluminum-chloride-sulphur-monochloride complex of constitution $AlCl_3.2S_2Cl_2$ upon an aromatic primary amine, said dyestuff being soluble in the sodium sulphide vat and being capable of dyeing cotton therefrom by the sulphur-vat dye process.

7. As a new dyestuff, the reaction product of an aluminum-chloride-sulphur-monochloride complex of constitution $AlCl_3.2S_2Cl_2$ upon a diaryl amine, said dyestuff being soluble in the sodium sulphide vat and being capable of dyeing cotton therefrom by the sulphur-vat dye process.

8. As a new compound, the reaction product of an aromatic compound having at least one basic nitrogen atom with the aluminum-chloride-sulphur-monochloride complex represented by the formula $AlCl_3.2S_2Cl_2$, said compound being a colored body capable of dyeing textile material by the sulphur-vat process.

9. The dyestuff obtained by reacting 1 part of carbazole with 6 parts of an aluminum-chloride-sulphur-monochloride complex of constitution $AlCl_3.2S_2Cl_2$, at the boiling point of the reaction mass, said dyestuff being characterized by its capacity to dye cotton from a sodium sulphide vat to a rich golden brown color.

ARTHUR LAWRENCE FOX.